United States Patent [19]

Stoltman

[11] Patent Number: 5,119,793
[45] Date of Patent: Jun. 9, 1992

[54] FUEL INJECTION

[75] Inventor: Donald D. Stoltman, Henrietta, N.Y.

[73] Assignee: General Motors Corporation, Detroit, Mich.

[21] Appl. No.: 624,112

[22] Filed: Dec. 7, 1990

[51] Int. Cl.$^5$ .......................................... F02M 67/02
[52] U.S. Cl. .................................................. 123/533
[58] Field of Search .................... 123/531, 533, 534

[56] References Cited

U.S. PATENT DOCUMENTS

| | | |
|---|---|---|
| 4,708,117 | 11/1987 | Mesenich et al. ................ 123/531 |
| 4,754,740 | 7/1988 | Emmenthal et al. ............. 123/531 |
| 4,768,720 | 9/1988 | Cocca .......................... 239/533.11 |
| 4,771,754 | 9/1988 | Reinke ............................ 123/533 |
| 4,794,901 | 1/1989 | Hong et al. ..................... 123/533 |
| 4,909,220 | 3/1990 | Field et al. ..................... 123/468 |

FOREIGN PATENT DOCUMENTS

WO86/00960 2/1986 World Int. Prop. O. .

*Primary Examiner*—Andrew M. Dolinar
*Attorney, Agent, or Firm*—Charles K. Veenstra

[57] ABSTRACT

A single fuel metering valve directs fuel to a plurality of charge delivery injectors.

1 Claim, 5 Drawing Sheets

FUEL INJECTION

TECHNICAL FIELD

This invention relates to a system for delivering a fuel-air charge to an engine, and to a system particularly adapted for delivering a fuel-air charge directly into an engine combustion chamber.

BACKGROUND

Systems under current consideration for delivering a charge of fuel and air directly into a plurality of engine combustion chambers employ a plurality of charge delivery injectors and a plurality of fuel metering injectors—one fuel metering injector for each charge delivery injector. Air is supplied to the charge delivery injectors, each fuel metering injector is energized to direct a metered quantity of fuel to its charge delivery injector, and each charge delivery injector is energized to deliver a charge of fuel and air directly into its associated combustion chamber.

SUMMARY OF THE INVENTION

This invention provides a fuel injection system having a single fuel metering valve that serves a plurality of charge delivery injectors. Use of a single fuel metering valve simplifies metering of fuel to the charge delivery injectors and allows a reduction in the size of the system.

This invention also provides a fuel injection system having a pump that supplies fuel and air in accordance with engine demands.

The details as well as other features and advantages of several embodiments of the fuel injection system provided by this invention are set forth in the remainder of the specification and are shown in the accompanying drawings.

DETAILED DESCRIPTION

Figure 1:
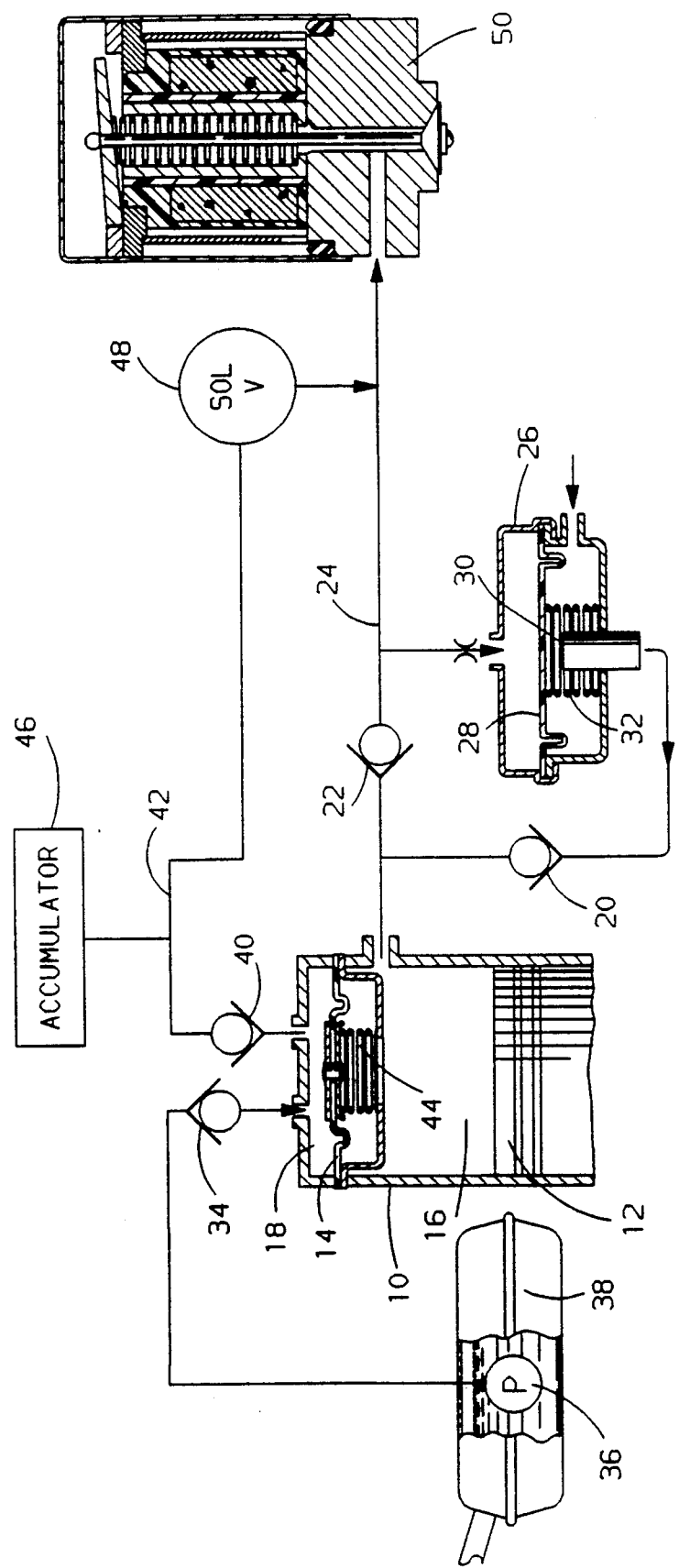
FIG. 1 is a schematic view of one embodiment of the fuel injection system provided by this invention.

Referring first to FIG. 1, a pump 10 has a piston 12 driven from the engine crankshaft. The pumping chamber above piston 12 is divided by a diaphragm 14 into an air chamber 16 and a fuel chamber 18.

Air chamber 14 receives air past an inlet check valve 20 and supplies air past an outlet check valve 22 to an air supply line 24. The air in line 24 is maintained at a pressure of 85 psig (about 586 kPa gage) by a pressure regulator 26. Pressure regulator 26 has a diaphragm 28 that senses the pressure in line 24—when the pressure in line 24 exceeds the desired pressure, diaphragm 28 seats across a valve seat 30 to interrupt air flow to inlet check valve 20, and when the pressure in line 24 is less than the desired pressure, a spring 32 lifts diaphragm 28 away from valve seat 30 to allow air flow to inlet check valve 20. Pressure regulator 26 thereby restricts the air flow to the amount required. An accumulator may be employed to assure that air in line 24 is maintained at the desired pressure.

Fuel chamber 18 receives fuel past an inlet check valve 34 from a transfer pump 36 disposed in a fuel tank 38, and supplies fuel past an outlet check valve 40 to a fuel supply line 42. The bias of a spring 44 acting on diaphragm 14 maintains the fuel in line 42 at a pressure of 100 psig (about 690 kPa gage)—15 psig (about 103 kPa gage) above the pressure in air line 24. An accumulator 46 may be employed to assure that the fuel in line 42 is maintained at the desired pressure.

A solenoid operated fuel metering valve 48 is controlled to direct a metered quantity of fuel from line 42 into the air from line 24, and a solenoid operated charge delivery injector 50 delivers a charge of fuel and air directly into the engine combustion chamber at the appropriate time. Only one charge delivery injector 50 is shown in FIG. 1, but it should be understood that a separate charge delivery injector is provided for each engine combustion chamber, and that the air and fuel lines divide downstream of pressure regulator 26 and fuel metering valve 48 with each charge delivery injector 50 having a branch air line and a branch fuel line.

Fuel metering valve 48 may be constructed and operated in the same manner as fuel metering injectors proposed for use in other gasoline fuel injection systems, and charge delivery injectors 50 may be constructed and operated in the same manner as charge delivery injectors proposed for use in other systems that deliver charges of fuel and air directly into the combustion chambers of a two-stroke engine.

Figure 2:
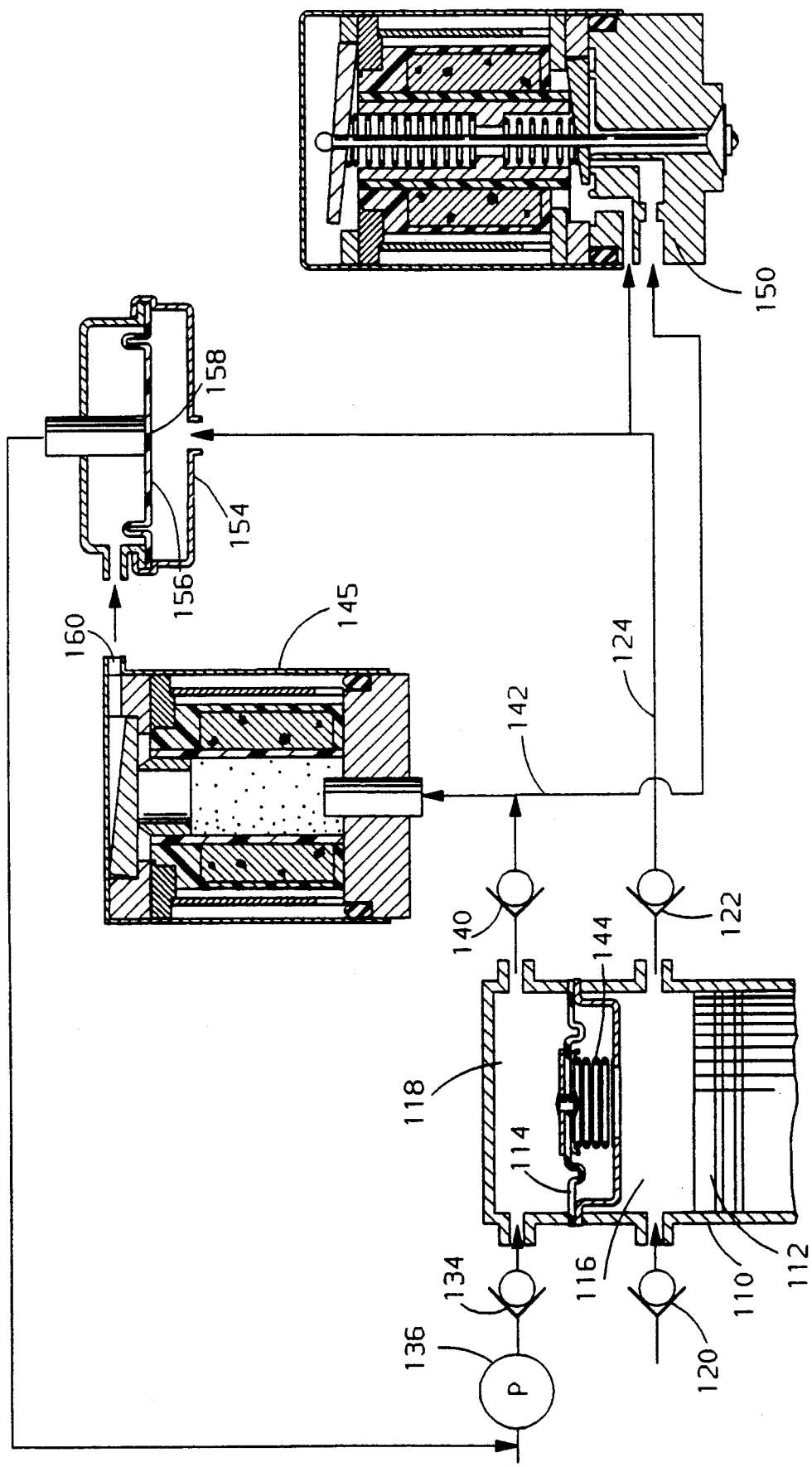
FIG. 2 is a schematic view of a second embodiment of the fuel injection system provided by this invention.

Referring now to FIG. 2, a pump 110 has a piston 112 driven from the engine crankshaft. The pumping chamber above piston 112 is divided by a diaphragm 114 into an air chamber 116 and a fuel chamber 118.

Air chamber 114 receives air past an inlet check valve 120 and supplies air past an outlet check valve 122 to an air supply line 124.

Fuel chamber 118 receives fuel past an inlet check valve 134 from a transfer pump 136, and supplies fuel past an outlet check valve 140 to a fuel supply line 142. The bias of a spring 144 acting on diaphragm 114 establishes a pressure in fuel supply line 142 above the pressure in air supply line 124.

A solenoid operated fuel metering valve 145 is controlled to divert a portion of the fuel away from line 142 to a pressure regulator 154. Pressure regulator 154 has a diaphragm 156 that senses the pressure in air line 124 and cooperates with a valve seat 158 to control fuel flow from pressure regulator 154 back to the inlet side of transfer pump 136. Pressure regulator 154 accordingly maintains the pressure of the fuel in the outlet 160 of fuel metering valve 145 equal to the air pressure in line 124.

Fuel metering valve 145 is thereby effective to maintain the pressure in fuel supply line 142 at a selected increment above the pressure in air supply line 124, and to vary the selected increment in accordance with engine operating conditions.

The remainder of the fuel in line 142 is directed to a plurality of solenoid operated charge delivery injectors 150. Charge delivery injectors 150 deliver charges of fuel and air directly into the engine combustion chambers 152 at the appropriate times. The quantity of fuel in each fuel-air charge is controlled by the pressure in line 142.

Because the fuel pressure in line 142 is controlled relative to the air pressure in line 124, fuel metering is independent of air pressure, and air pressure may be varied as desired to influence the spray characteristics of the charge delivered by injector 150.

Charge delivery injectors 150 employ features of the charge delivery injector set forth in U.S. patent application Ser. No. 07/369506 filed 21 June 1989 in the names of E.R. Stettner and D.D. Stoltman; the disclosure of that application is incorporated by reference.

Figure 3:
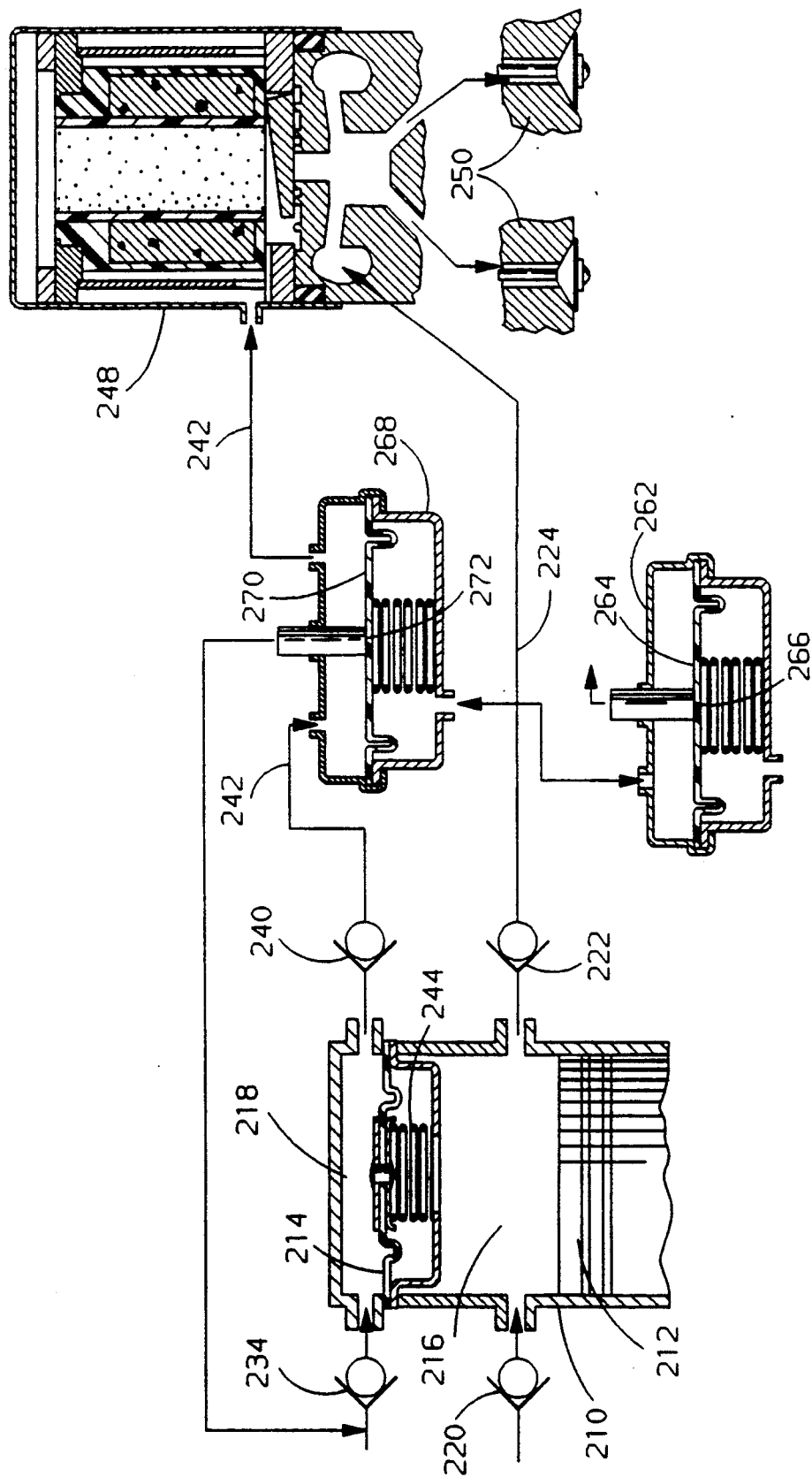
FIG. 3 is a schematic view of a third embodiment of the fuel injection system provided by this invention.

Referring now to FIG. 3, a pump 210 has a piston 212 driven from the engine crankshaft. The pumping chamber above piston 212 is divided by a diaphragm 214 into an air chamber 216 and a fuel chamber 218.

Air chamber 214 receives air past an inlet check valve 220 and supplies air past an outlet check valve 222 to an air supply line 224.

Fuel chamber 218 receives fuel past an inlet check valve 234 and supplies fuel past an outlet check valve 240 to a fuel supply line 242. The bias of a spring 244 acting on diaphragm 214 establishes a pressure in fuel supply line 242 above the pressure in air supply line 224.

An air pressure regulator 262 has a diaphragm 264 that senses the pressure in air line 224 and cooperates with a valve seat 266 to divert excess air from air supply line 224. Pressure regulator 262 accordingly maintains the air in line 224 at a pressure of 85 psig (about 586 kPa gage).

A fuel pressure regulator 268 has a diaphragm 270 that senses the difference between the pressure in fuel line 242 and the pressure in air line 224 and cooperates with a valve seat 272 to divert excess fuel from fuel supply line 242. Pressure regulator 268 accordingly maintains the fuel in line 242 at a pressure of 100 psig (about 690 kPa gage)—15 psig (about 103 kPa gage) above the pressure in air line 224.

A solenoid operated fuel metering valve 248 is controlled to direct metered quantities of fuel from line 242 into the air from line 224, and solenoid operated charge delivery injectors 250 deliver charges of fuel and air directly into the engine combustion chambers at the appropriate times.

Fuel metering valve 248 may be constructed and operated in a manner similar to fuel metering injectors proposed for use in other gasoline fuel injection systems, and charge delivery injectors 250 may be constructed and operated in the same manner as charge delivery injectors proposed for use in other systems that deliver charges of fuel and air directly into the combustion chambers of a two-stroke engine.

Figure 4:
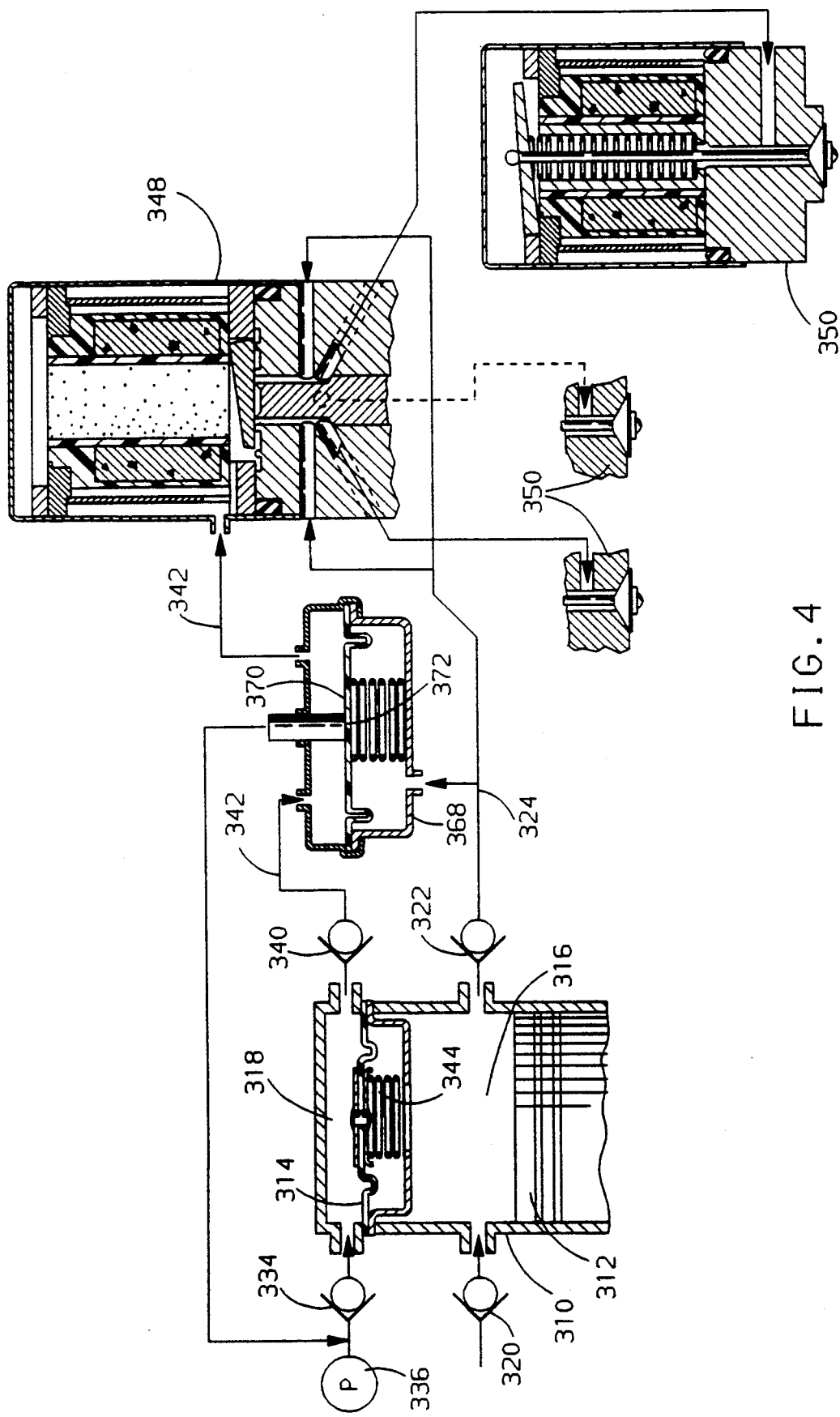
FIG. 4 is a schematic view of a fourth embodiment of the fuel injection system provided by this invention.

Referring now to FIG. 4, a pump 310 has a piston 312 driven from the engine crankshaft. The pumping chamber above piston 312 is divided by a diaphragm 314 into an air chamber 316 and a fuel chamber 318.

Air chamber 314 receives air past an inlet check valve 320 and supplies air past an outlet check valve 322 to an air supply line 324 at a pressure of 85 psig (about 586 kPa gage).

Fuel chamber 318 receives fuel past an inlet check valve 334 from a transfer pump 336, and supplies fuel past an outlet check valve 340 to a fuel supply line 342. The bias of a spring 344 acting on diaphragm 314 establishes a pressure in fuel supply line 342 above the pressure in air supply line 324.

A fuel pressure regulator 368 has a diaphragm 370 that senses the difference between the pressure in fuel line 342 and the pressure in air line 324 and cooperates with a valve seat 372 to divert excess fuel from fuel supply line 342 back to the discharge side of transfer pump 336. Pressure regulator 368 accordingly maintains the fuel in line 342 at a pressure of 100 psig (about 690 kPa gage)—15 psig (about 103 kPa gage) above the pressure in air line 324.

A solenoid operated fuel metering valve 348 is controlled to direct metered quantities of fuel from line 342 into the air from line 324, and solenoid operated charge delivery injectors 350 deliver charges of fuel and air directly into the engine combustion chambers at the appropriate times.

Charge delivery injectors 350 may be constructed and operated in the same manner as charge delivery injectors proposed for use in other systems that deliver charges of fuel and air directly into the combustion chambers of a two-stroke engine.

Fuel metering valve 348 may be constructed and operated in a manner similar to fuel metering injectors proposed for use in other gasoline fuel injection systems. As alternatives, the fuel metering valves 448 and 548 set forth in FIGS. 5-6 and 7-8 may be employed as the fuel metering valve of the system set forth in FIG. 4, and the systems set forth in FIGS. 1 and 3.

Fuel metering valves 448 and 548 employ features of the fuel injector set forth in U.S. patent application Ser. No. 07/010296 filed 23 January 1987 in the names of E.R. Stettner and D.D. Stoltman; the disclosure of that application is incorporated by reference.

Figure 5:
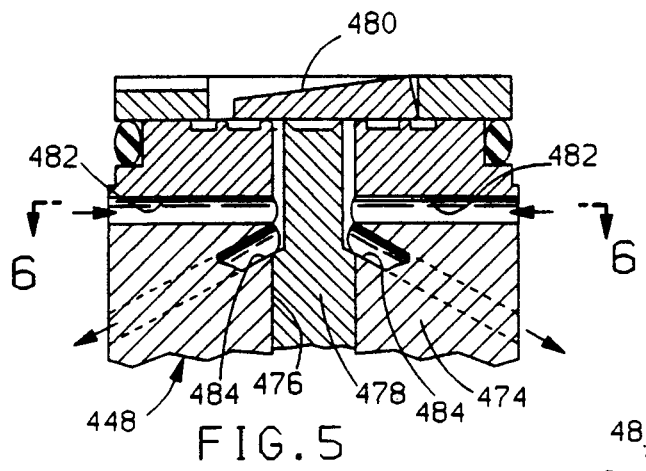
FIG. 5 is a sectional elevational view through the valve seat region of one embodiment of a fuel metering valve that may be used in the system embodiments of FIGS. 1, 3 and 4.
Figure 6:
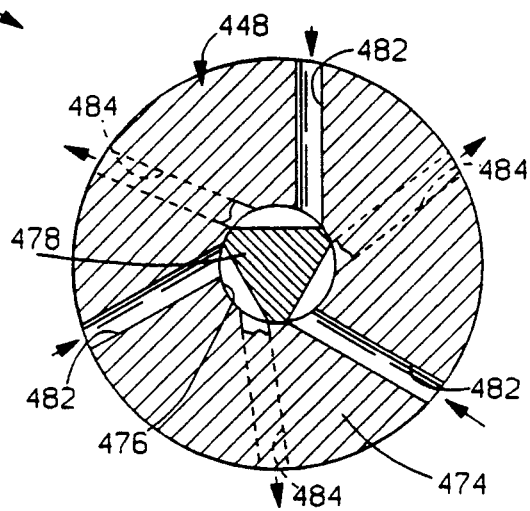
FIG. 6 is a transverse sectional view through the valve seat region of the FIG. 5 fuel metering valve.

Referring to FIGS. 5-6, the base 474 of fuel metering valve 448 has a central bore 476 containing a triangular plug 478. The points of plug 478 engage bore 476 to divide bore 476 into three sectors that receive fuel past a valve member 480. Each sector has an inlet passage 482 that receives air from a branch of air supply line 324, and a discharge passage 484 that directs air and fuel to a charge delivery injector 350.

Figure 7:
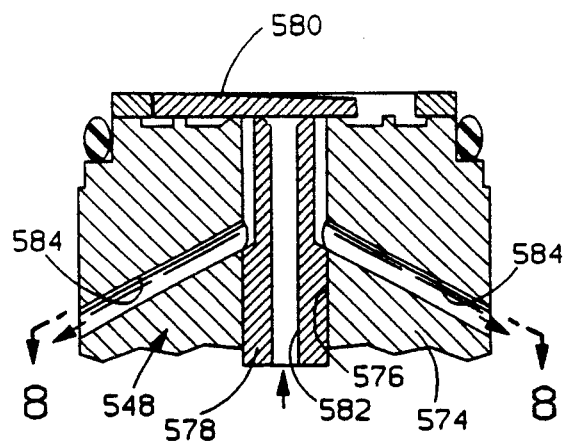
FIG. 7 is a sectional elevational view through the valve seat region of a second embodiment of a fuel metering valve that may be used in the system embodiments of FIGS. 1, 3 and 4.
Figure 8:
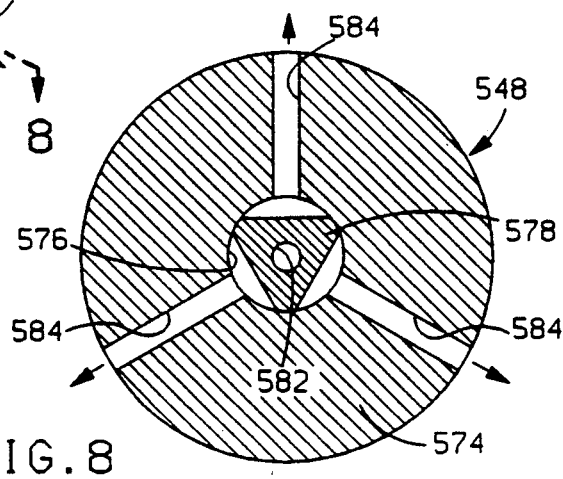
FIG. 8 is a transverse sectional view through the valve seat region of the FIG. 7 fuel metering valve.

Referring to FIGS. 7-8, the base 574 of fuel metering valve 548 has a central bore 576 containing a triangular plug 578. The points of plug 578 engage bore 576 to divide bore 576 into three sectors that receive fuel past a valve member 580. Plug 578 is hollow to provide a passage 582 that receives air from air line 324 and directs air past valve member 580 into each sector of bore 576. Each sector has a discharge passage 584 that directs air and fuel to a charge delivery injector 350.

It will be appreciated that this system requires only one fuel metering valve to control fuel flow to a plurality of charge delivery injectors. This invention accordingly provides the synergy of a fuel injection system having a single fuel metering valve that controls fuel flow for a plurality of combustion chambers, with a fuel injection system having a charge delivery injector that delivers a charge of fuel and air directly into an engine combustion chamber.

It will be appreciated that although this fuel injection system is particularly adapted for direct injection of fuel and air into the combustion chamber of a two-stroke engine, it also is suitable for direct injection in a four-stroke engine and for other fuel injection applications.

I claim:

1. A fuel injection system having a plurality of charge delivery injectors each adapted to deliver a charge of fuel and air to an engine, fuel metering valve means adapted to direct metered quantities of fuel to the charge delivery injectors, and a pump supplying fuel to said fuel metering valve means and air to said charge delivery injectors, said pump including a piston defining a portion of a pumping chamber, a diaphragm dividing said pumping chamber into an air chamber adjacent said piston and a fuel chamber separated from said piston by said air chamber and said diaphragm, wherein said piston reciprocates to compress air in said air chamber, wherein said diaphragm flexes to increase the pressure of fuel in said fuel chamber as air is compressed in said air chamber, and wherein said pump further includes a spring biasing said diaphragm to increase the pressure of fuel in said fuel chamber a selected amount above the pressure of air in said air chamber.

* * * * *